Nov. 15, 1938. P. SCHOLL ET AL Re. 20,921

ABSORPTION REFRIGERATING APPARATUS

Original Filed Feb. 27, 1932

Inventors
Paul Scholl,
Carl Kühnel
by Knight Bros
Attorneys

Reissued Nov. 15, 1938 Re. 20,921

UNITED STATES PATENT OFFICE 20,921

ABSORPTION REFRIGERATING APPARATUS

Paul Scholl, Berlin-Siemensstadt, and Carl Kühnel, Berlin-Charlottenburg, Germany, assignors to Siemens-Schuckertwerke Aktiengesellschaft, Berlin-Siemensstadt, Germany, a corporation of Germany Original No. 1,956,402, dated April 24, 1934, Serial No. 595,486, February 27, 1932. Application for reissue April 2, 1936, Serial No. 72,334. In Germany March 4, 1931

28 Claims. (Cl. 62—119.5)

This invention relates to continuous absorption refrigerating apparatus of the type in which an inert gas is used as a pressure equalizing medium and more particularly to the use of means for circulating inert gas or other fluid within such a system or apparatus.

It is well known in the art of continuous absorption refrigeration to employ an inert gas as an auxiliary pressure equalizing medium and it is also well known to circulate this gas by means of a fan or the like. Such an arrangement is disclosed in the U. S. patent to Geppert, No. 662,690.

It is also old to provide a nozzle or jet for circulating the inert gas in a system of the type described, gas being supplied to the jet or nozzle by means of a boiler or the like. Such an arrangement is disclosed in the U. S. patent to Altenkirch, No. 1,615,353, which was reissued as Reissue No. 18,924.

The gas circulating means of the type shown in the Geppert patent requires a seal or stuffing box where the shaft used to drive the fan enters the apparatus. This difficulty is overcome in the Altenkirch patent but in Altenkirch's device some of the refrigerant within the boiler is wasted, in so far as cooling effect is concerned, in order that it may be employed for circulating the inert gas.

It is an object of the present invention to overcome both of the disadvantages mentioned above by providing electro-magnetic gas circulating devices for circulating fluids in absorption refrigerating systems or the like, which devices may or may not be hermetically sealed within the system, as desired.

It is another object to provide an oscillatory element rather than a rotary one, for actuating the fluid, so that no moving parts such as shafts, or rotary fans are necessary and no lubrication is required.

It is another object of the invention to provide an improved electro-magnetically operated oscillatory element in combination with a nozzle of a particular construction, the arrangement being such that inert gas may be circulated in a system of the type mentioned.

It is still another object to provide a nozzle for circulating a fluid in a refrigerating system with power driven means for supplying gas to the nozzle, the power driven means being adapted to be sealed within the system, if desired.

It is still a further object of the invention to mount a diaphrgm in a hermetically sealed chamber connected to a refrigerating system or the like, and to provide means for transmitting power through the wall of the chamber to cause the diaphragm to oscillate and thus in turn cause movement of fluids within the refrigerating system.

Other objects and advantages reside in certain novel features of the arrangement and construction as will be apparent from the following description taken in connection with the accompanying drawing, in which—

Figure 1:
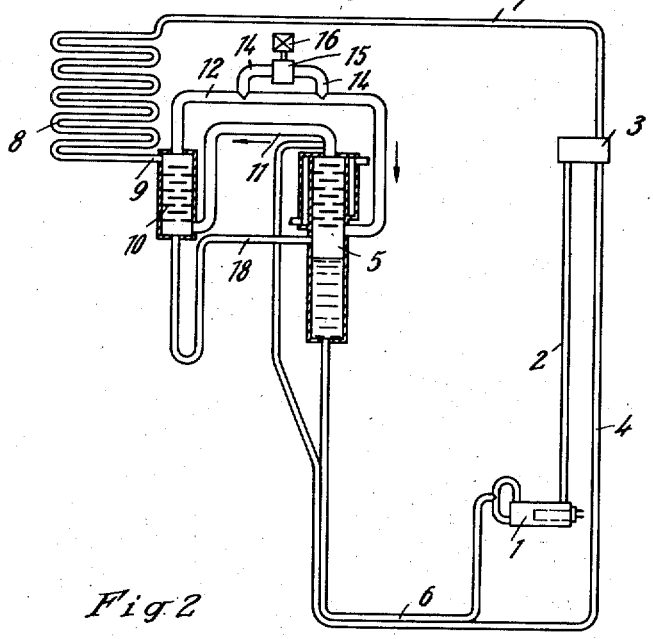
Figure 2:
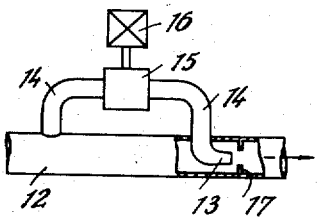
Figure 3:
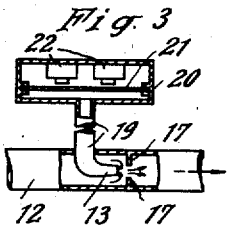
Figure 4:
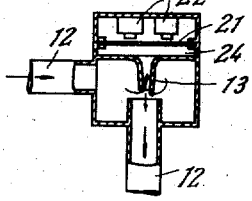

Figure 1 is a diagrammatic illustration of a continuous absorption refrigerating system in which inert gas is circulated between the evaporator and the absorber by means of a gas circulating device constructed in accordance with the present invention, Figure 2 is an enlarged fragmentary view of a portion of the conduit forming part of the inert gas circuit of the arrangement of Figure 1, the conduit being partly cut away to show how the gas circulating means is associated therewith, Figure 3 is a vertical cross sectional view of a modified form of gas circulator which may be used in place of the gas circulator of Figure 1, the figure showing a fragment of an inert gas conduit associated therewith, and Figure 4 is a vertical cross sectional view of still another embodiment of gas circulating means which may be used in place of the arrangement of Figure 1, the view showing gas conduits connected thereto.

Referring to the drawing in detail, and first to the arrangement of Figure 1, it will be seen that a continuous absorption refrigerating system has been illustrated as consisting of a generator or boiler 1 having a gas lift pump 2 associated therewith for conveying refrigerant gas and absorption liquid to the gas separation chamber 3. The gas separation chamber 3 is connected to the top of the absorber 5 by a liquid conduit 4. The absorber 5 consists of a cylindrical vessel, the lower portion of which may act as a reservoir as indicated in Figure 1, while the other portion is provided with baffle plates and a jacket through which cooling water may be passed to take heat away from the fluids therein. The bottom of the absorber vessel 5 is connected to the boiler 1 by means of a conduit 6. The conduits 6 and 4 may be in heat exchange relation as illustrated. The boiler may be like that shown in the U. S. patent to Altenkirch, No. 1,877,857.

Refrigerant vapor generated in the boiler and in the gas lift pump 2 and gas separation chamber 3, passes through a conduit 7 which connects the top of the gas separation chamber to the condenser 8. The condenser 8 may be a coil of pipe or a bank of reversely bent pipes, as illustrated, and functions to cause the refrigerant vapor to liquefy.

The bottom of the condenser is connected to the evaporator 10 by means of a conduit 9. The evaporator may consist of a vertically disposed cylindrical vessel provided with baffle plates therein. It is connected to the absorber by means of two inert gas conduits 11 and 12. The conduit 11 is adapted to convey gas from the top of the absorber 5 to the bottom of the evaporator 10, while the conduit 12 is adapted to convey gas from the top of the evaporator into the lower or intermediate portions of the absorber vessel 5 beneath the baffle plates in that vessel.

The important features of the present invention reside in the means for causing the inert gas to circulate over the path just described. Suitable power driven means may be associated with either of the conduits 11 or 12 or with the evaporator or the absorber which go to make up the inert gas circuit. For purposes of illustration the arrangement of Figures 1 and 2 shows the gas circulator associated with the conduit 12. The arrangement is such that the inert gas or other gases are caused to circulate from left to right in this conduit as viewed in Figures 1 and 2.

Broadly speaking, the gas circulator includes a nozzle 13 located within the pipe 12 and means for applying gas to this nozzle at a slightly higher pressure than that existing in the conduit 12 so that as gas emerges from the nozzle, directional movement is imparted to gases in the conduit 12.

In the arrangement of Figures 1 and 2, the driving gas is supplied to the nozzle 13 by means of a conduit 14 connected to the conduit 12 slightly in advance of the nozzle 13, the conduit 14 having a small gas compressor 15 connected therein. The compressor 15 may be driven by a small motor 16 or by other motivating means exterior of the conduits 14. It would, of course, be within the purview of the invention to mount the motor or other actuating means for the compressor 15 within a hermetically sealed chamber if desired.

A small annular disk 17 may be located just in front of the nozzle 13 within the pipe 12, the opening in the disk corresponding in area to the cross section of the gas jet emanating from the nozzle in order to aid in the circulation of gases through the pipe 12. With such an arrangement the kinetic energy of the gas particles flowing through the disk is more readily transferred to the gas mixture within the conduit 12, and since the gas jet completely fills the opening in disk 17 there is but little tendency for the formation of eddy currents in the conduit 12.

Assuming that the electric motor 16 of the arrangement shown in Figure 1 just described is energized and that heat is applied to the boiler 1, the refrigerating system operates as follows:

The refrigerant gas (such as ammonia), generated in the boiler system, flows through the conduit 7, thence in the condenser 8, where it is liquefied, and flows into the evaporator. In the evaporator it evaporates into the inert gas, (such as hydrogen, nitrogen, air, or the like,) and flows with the inert gas through the conduit 12 under the influence of the compressor 15 and nozzle 13. The mixture of refrigerant gas and inert gas enters the absorber, and flows upwardly therethrough, coming into contact with the absorption liquid (such as water) as it does so. Refrigerant is absorbed out of the inert gas by the absorption liquid and passes back to the boiler system through the conduit 6.

At the same time, absorption liquid is circulated through the boiler system and absorber, the absorption liquid flowing from the boiler through the conduit 2, to the gas separation chamber and then through the conduit 4 into the absorber and back to the boiler through the conduit 6.

At the same time the inert gas is circulated from the evaporator 10 through the conduit 12 under the influence of the nozzle 13, the upper portion of the absorber vessel 5, and back to the evaporator through the conduit 11.

Any liquid collecting in the evaporator which had not evaporated may flow into the absorber through the U-pipe 18.

The arrangement of Figure 1 illustrates only a conventional absorption refrigerator inert gas circuit, but it is obvious that the present invention may be employed to drive inert gas or other fluids in other hermetically sealed systems, for example, refrigerating systems in which two inert gas circuits are employed as disclosed in U. S. patent to Altenkirch, No. 2,000,005, granted May 7, 1935.

In the arrangement of Figures 1 and 2 the motor which is used to drive the compressor 15 is shown as not hermetically sealed within the refrigerating system. An arrangement which is, or may be hermetically sealed within a refrigerating system, and which has additional advantages over that shown in the arrangement of Figures 1 and 2, is shown in Figure 3.

In Figure 3, the nozzle outlet 13 is connected to a casing or chamber member 20 by means of a conduit 19. A flexible diaphragm 21 is disposed within the casing 20 in such a manner that it may oscillate upon being energized by alternating current electromagnets 22, which project through and are hermetically sealed to the wall of the casing 20. In accordance with known principles, vibration of the diaphragm 21 within the casing 20 will change the volume of the space between that diaphragm and the lower part of the casing 20 and this will cause air to be sucked into and expelled from the nozzle 13. The air flow into and out of the nozzle, however, is peculiar in that the air which flows into the nozzle enters from points around the rim, as indicated by the arrows in Figure 3, whereas that which is expelled passes in parallel with the axis of the nozzle mouth. The frequency of vibration of the diaphragm 21 may be such that practically a continuous stream or jet of expelled gas is produced and the operation of the nozzle and the disk 17 in front of it becomes practically the same as though a continuous stream of air were provided as in the arrangement of Figure 1.

A modified arrangement similar to that of Figure 3 is shown in the arrangement of Figure 4, in which a casing or chamber member is so connected to the conduit 12 that the entire pump assembly, that is, the nozzle, diaphragm, and electromagnet are mounted therein. The discharge portion of the conduit 12 extends upwardly through the bottom of the nozzle so that its upper end acts in a way similar to that of the perforated disk 17 in the arrangement of Figures 2 and 3. The diaphragm 21, mounted in the upper part of the chamber, is oscillated by the electro-magnet 22 just the same as in the arrangement of Figure 3, and a pulsating jet is thus delivered from the nozzle due to the changes in volume of the gas space 24 between the diaphragm and the nozzle. As in Figure 3 the direction of movement of gas is indicated by the arrows.

In the arrangements described above, only a few of the embodiments of the present invention have been disclosed, but it is obvious that various changes may be made without departing from the spirit of the invention or the scope of the annexed claims.

We claim:

1. In an absorption refrigerating apparatus of the continuous type comprising a generator, a condenser, an evaporator and an absorber, and containing a refrigerating agent and an auxiliary inert gas mixed with the refrigerating agent in the evaporator and absorber, a fluid conduit connecting said evaporator and said absorber to form a circulating system for said agent and said auxiliary gas, a nozzle in said fluid conduit for emitting a gas jet to direct said gaseous agents in a predetermined direction of circulation, and an electrically operated mechanical means connected with said nozzle for forcing a portion of said gas travelling in said conduit through said nozzle to produce said jet.

2. In an absorption refrigerating apparatus of the continuous type comprising a generator, a condenser, an evaporator and an absorber, and containing a refrigerating agent and an auxiliary inert gas mixed with the refrigerating agent in the evaporator and absorber, a fluid conduit connecting said evaporator and said absorber to form a circulating system for said agent and said auxiliary gas, a second conduit branching off said first-named conduit and terminating in a nozzle in said first-named conduit to direct the gas mixture in said conduit in a predetermined direction of circulation, and an electrically operated mechanical means connected with said branch conduit for producing the gas pressure required for forcing a portion of said conduit gas through said nozzle.

3. In an absorption refrigerating apparatus of the continuous type comprising a generator, a condenser, an evaporator and an absorber, and containing a refrigerating agent and an auxiliary inert gas mixed with the refrigerating agent in the evaporator and absorber, a fluid conduit connecting said evaporator and said absorber to form a circulating system for said agent and said auxiliary gas, a nozzle in said fluid conduit to direct said gaseous agents in a predetermined direction of circulation, an enclosed gas chamber connected with said nozzle and electrically operated mechanical means for varying periodically the volume of said gas chamber for drawing conduit gas through said nozzle into said space and for forcing it out through said nozzle back into said conduit in the desired circulating direction.

4. In an absorption refrigerating apparatus of the continuous type comprising a generator, a condenser, an evaporator and an absorber, and containing a refrigerating agent and an auxiliary inert gas mixed with the refrigerating agent in the evaporator and absorber, a fluid conduit connecting said evaporator and said absorber to form a circulating system for said agent and said auxiliary gas, a nozzle in said fluid conduit to direct said gaseous agents in a predetermined direction of circulation, and an electrically operated mechanical means for producing the gas pressure required for forcing a portion of said gas through said nozzle, comprising a closed gas chamber connected with said nozzle and having a diaphragm for closing said chamber to the outside, and electrical means for oscillating said diaphragm to periodically vary the volume of said gas chamber, for drawing conduit gas through said nozzle into said chamber and forcing it out through said nozzle back into said conduit in the desired circulating direction.

5. In an absorption refrigerating apparatus of the continuous type comprising a generator, a condenser, an evaporator and an absorber, and containing a refrigerating agent and an auxiliary inert gas mixed with the refrigerating agent in the evaporator and absorber, a fluid conduit connecting said evaporator and said absorber to form a circulating system for said agent and said auxiliary gas, a nozzle in said fluid conduit to direct said gaseous agents in a predetermined direction of circulation, and an electrically operated mechanical means for producing the gas pressure required for forcing a portion of said gas through said nozzle, comprising a closed gas chamber connected with said nozzle and having a diaphragm for closing said chamber to the outside, and electrical means for oscillating said diaphragm to periodically vary the volume of said gas chamber, for drawing conduit gas through said nozzle into said chamber and for forcing it out through said nozzle back into said conduit in the desired circulating direction, said circulation conduit being enlarged into a chamber-like space at the portion surrounding said nozzle.

6. In an absorption refrigerating apparatus of the continuous type comprising a generator, a condenser, an evaporator and an absorber, and containing a refrigerating agent, and an auxiliary inert gas mixed with the refrigerating agent in the evaporator and absorber, a fluid conduit connecting said evaporator and said absorber to form a circulating system for said agent and said auxiliary gas, a nozzle in said fluid conduit to direct said gaseous agents in a predetermined direction of circulation, and means for producing the gas pressure required for forcing a portion of said conduit gas through said nozzle, comprising a closed gas chamber connected with said nozzle, an oscillatably disposed disk for closing said gas chamber to the exterior, and an electrically energized magnet outside of said space for oscillating said disc continuously to periodically vary the volume of said chamber, said circulation conduit being enlarged at the portion surrounding said nozzle into a chamber-like space located in the path of said gas at a point where the flow of gas changes direction.

7. In an absorption refrigerating apparatus of the continuous type comprising a generator, a condenser, an evaporator, and an absorber, and containing a refrigerating agent and an auxiliary inert gas mixed with the refrigerating agent in the evaporator and absorber, a fluid conduit connecting said evaporator and said absorber to form a circulating system for said agent and said auxiliary gas, a nozzle in said fluid conduit to direct said gaseous agents in a predetermined direction of circulation, and means for producing the gas pressure required for forcing a portion of said gas through said nozzle, comprising a closed gas chamber, connected with said nozzle and electrically operated mechanical means for varying periodically the volume of said gas chamber for drawing conduit gas through said nozzle into said chamber and for forcing it out through said nozzle back into said conduit in the desired circulating direction, and a centrally perforated disk disposed in said conduit in front of the outlet of said nozzle.

8. In an absorption refrigerating apparatus of the continuous type comprising a generator, a condenser, an evaporator and an absorber, and containing a refrigerating agent and an auxiliary inert gas mixed with the refrigerating agent in the evaporator and absorber, a fluid conduit connecting said evaporator and said absorber to form a circulating system for said agent and said auxiliary gas between said vessels, and an electrically operated diaphragm gas pump hermetically connected with said conduit for drawing in conduit gas and for forcing it back into said conduit in the direction of the other vessel to produce a gas circulation in said direction in the circulating system.

9. In an absorption refrigerating apparatus of the continuous type having a gas mixture circuit including an absorber, an evaporator and tubular connections between said vessels, an electromagnetically operated oscillatory diaphragm exposed to the gas mixture in one of said tubular connections and hermetically sealed against the outside for impelling the gas contacting with the diaphragm in the direction of one of said vessels to maintain gas circulation between said vessels.

10. In an absorption refrigerating apparatus of the continuous type having a gas mixture circuit including an absorber an evaporator and tubular connections between said vessels, an electromagnetically operated diaphragm gas pump connected with one of said tubular connections and communicating with the gas mixture therein, for impelling the mixture by the diaphragm oscillations, and means disposed in said connection opposite to said diaphragm for guiding the impelled gas in a desired direction.

11. In an absorption refrigerating apparatus of the continuous type having a gas circuit containing a gas, and including an absorber, an evaporator and tubular connections between said vessels, a gas conveyor hermetically sealed to said gas circuit and comprising an electromagnetically operated oscillatory diaphragm exposed to the gas in one of said tubular connections, for impelling the gas contacting with the diaphragm in the direction of one of said vessels to produce movement of the gas from one vessel to the other.

12. In absorption refrigerating apparatus of the type using an inert gas, the combination of conduits providing a circuit for the inert gas and means for driving the inert gas over its circuit, said means including an electro-magnetically operated vibratory element mounted in one of said conduits and positioned to cause directional movement to be imparted to a body of the inert gas adjacent thereto.

13. In absorption refrigerating apparatus of the type using an inert gas, the combination of conduits providing a circuit for the inert gas and means for driving the inert gas over its circuit, said means including a flexible vibratory element mounted in one of said conduits and positioned to cause directional movement to be imparted to a body of the inert gas adjacent thereto and an arrangement for transmitting power to the element to operate the same from the exterior of of the conduit in which said element is located.

14. In absorption refrigerating apparatus of the type using an inert gas, the combination of conduits providing a circuit for the inert gas and means for driving the inert gas over its circuit, said means including a flexible vibratory element mounted in one of said conduits and positioned to cause directional movement to be imparted to a body of the inert gas adjacent thereto and an arrangement for causing said element to oscillate.

15. In absorption refrigerating apparatus using inert gas, the combination of means providing a circuit for the inert gas, and for circulating the inert gas therethrough, a vibratory element mounted in said means for driving the inert gas over its circuit and electrically actuated means for transmitting power from the exterior to the interior of said apparatus to cause oscillation of said element, said power transmitting means being hermetically sealed to the apparatus.

16. In continuous absorption refrigerating apparatus using inert gas, the combination of a main conduit forming part of means providing a circuit for the flow of the inert gas, a branch conduit branching off from the main conduit, electrically operated means for raising the gas pressure in said branch conduit and means for discharging gas from the branch conduit back into said main conduit to impart directional movement to the gas in said main conduit and thereby cause the gas to travel over its circuit.

17. In a continuous absorption refrigerating apparatus using inert gas, the combination of a main conduit forming part of means providing a circuit for the flow of the inert gas, a branch conduit having a portion located within said main conduit, electrically operated oscillatory means for raising the gas pressure within said branch conduit and for causing the gas to be discharged from said branch conduit back into said main conduit to impart directional movement to the gas in said main conduit and thereby cause the gas to travel over its circuit.

18. In a continuous absorption refrigerating apparatus using inert gas, the combination of a main conduit forming part of means providing a circuit for the flow of the inert gas, a branch conduit having a portion located within said main conduit, electrically operated oscillatory means for raising the gas pressure within said branch conduit and for causing the gas to be discharged from said branch conduit back into said main conduit to impart directional movement to the gas in said main conduit and thereby cause the gas to travel over its circuit, said electrically operated oscillatory means being hermetically sealed to the apparatus.

19. In absorption refrigerating apparatus of the type using a pressure equalizing medium, the combination of an evaporator and an absorber, means interconnecting the absorber and evaporator in circuit to form a passage for the equalizing medium, and means for circulating said medium including electro-magnetically operated means for altering the movement of portions of the medium, and then suddenly imparting pulsating movement thereto in a direction to cause movement of the main body of the medium in a direction parallel to the axis thereof.

20. The method of circulating an inert medium in a fluid circuit between the evaporator and absorber of an absorption refrigeration system comprising alternately drawing portions of the medium toward a focal point and then suddenly imparting different directional movement to such portions of medium into contact with other adjacent portions of the medium whereby the other adjacent portions of the medium will be caused to flow in said different direction.

21. The method of circulating an inert medium in a fluid circuit between the evaporator and absorber of an absorption refrigeration system comprising forming a stream, causing portions of the stream to move toward a focal point, and then suddenly imparting rapid movement to such portions in a direction parallel to the axis of the stream to thereby cause movement of the medium stream.

22. The method of circulating an inert medium in a fluid circuit between the evaporator and absorber of an absorption refrigeration system by means hermetically sealed within the system comprising forming a stream of the medium, momentarily withdrawing portions of the medium from the stream, and suddenly returning such portions to the stream in pulsating jets in a direction parallel to the axis thereof whereby directional movement is imparted to the medium stream.

23. The method of circulating an inert medium in a fluid circuit between the evaporator and absorber of an absorption refrigeration system comprising forming a stream of the medium, momentarily altering the normal movement of portions of the medium, and suddenly imparting pulsating movement to such portions in a direction to cause movement of the main portions of the stream in a direction parallel to the axis thereof.

24. The method of operating an absorption refrigeration system employing at least one refrigerant, an absorption medium therefor and a pressure equalizing medium, comprising separating the refrigerant from the absorption medium by the application of heat, condensing said refrigerant, allowing said refrigerant to evaporate into said pressure equalizing medium, passing said mediums last mentioned into intimate contact with the absorption medium and then returning the equalizing medium in a stream to the refrigerant evaporating zone by momentarily withdrawing portions of the stream from its normal path and suddenly returning such portions to the stream in pulsating jets in a direction parallel to the original axis of the stream to thereby cause forward movement of the main portions of the pressure equalizing medium.

25. In a refrigerating apparatus, means for providing a circulating system for the flow of fluid therein in a circuit between the evaporator and absorber, and vibratable means in said system operable to remove portions of said fluid from the main body of fluid in said system and to expel said portions of fluid in a different direction into said main body of fluid to move the main body of fluid in said different direction.

26. In a refrigerating apparatus, means for providing a circulating system for the flow of fluid therein in a circuit between the evaporator and absorber, and directional fluid impelling means comprising conduit means arranged in said circulating system and having a discharge opening arranged in the direction desired to impel the main body of fluid in the circulating system, and means for causing portions of the fluid in said system to travel inwardly of said conduit means and for pulsatingly expelling said portions of fluid through said discharge opening into contact with the main body of fluid in said circulating system to cause the fluid to travel in said desired direction.

27. A method of circulating a fluid in a fluid circuit between the evaporator and absorber of a refrigerating system, comprising causing portions of the fluid to be removed from the main body of fluid and then pulsatingly impelling said removed portions of fluid into said main body of fluid to urge the main body of fluid to travel in the same direction as the direction of said impelled portions of fluid when brought into contact with said main body of fluid.

28. In an absorption refrigerating apparatus comprising a generator, a condenser, an evaporator and an absorber and containing a refrigerating agent and an auxiliary inert gas mixed with the refrigerating agent in the evaporator and absorber, means including the evaporator and absorber providing a circuit for the agent and the auxiliary gas, a nozzle in the circuit for admitting a gas jet to direct said gaseous agent in a predetermined direction through the circuit and an electrically operated means connected with said nozzle for forcing a portion of said gas travelling in said conduit through said nozzle to produce said jet.

PAUL SCHOLL.
CARL KÜHNEL.